US 7,440,126 B2

(12) United States Patent
Hull et al.

(10) Patent No.: US 7,440,126 B2
(45) Date of Patent: Oct. 21, 2008

(54) PRINTER WITH DOCUMENT-TRIGGERED PROCESSING

(75) Inventors: Jonathan J. Hull, San Carlos, CA (US); Kurt W. Piersol, Santa Cruz, CA (US); Peter E. Hart, Menlo Park, CA (US)

(73) Assignee: Ricoh Co., Ltd, Tokyo (JP)

( * ) Notice: Subject to any disclaimer, the term of this patent is extended or adjusted under 35 U.S.C. 154(b) by 925 days.

(21) Appl. No.: 10/814,580

(22) Filed: Mar. 30, 2004

(65) Prior Publication Data

US 2005/0068569 A1    Mar. 31, 2005

Related U.S. Application Data

(60) Provisional application No. 60/506,303, filed on Sep. 25, 2003, provisional application No. 60/506,302, filed on Sep. 25, 2003.

(51) Int. Cl.
 *G06F 3/12* (2006.01)
 *G06F 15/00* (2006.01)
 *G06K 1/00* (2006.01)
(52) U.S. Cl. .................................. 358/1.15; 358/1.17
(58) Field of Classification Search ................ 358/1.15, 358/1.17, 2.1, 3.28
 See application file for complete search history.

(56) References Cited

U.S. PATENT DOCUMENTS

| 4,133,007 | A |   | 1/1979  | Wessler et al.   |
|-----------|---|---|---------|------------------|
| 4,205,780 | A |   | 6/1980  | Burns et al.     |
| 4,619,522 | A | * | 10/1986 | Imai ............ 399/55 |
| 4,635,132 | A |   | 1/1987  | Nakamura         |
| 4,734,898 | A |   | 3/1988  | Morinaga         |
| 4,754,485 | A |   | 6/1988  | Klatt            |
| 4,807,186 | A |   | 2/1989  | Ohnishi et al.   |
| 4,831,610 | A |   | 5/1989  | Hoda et al.      |
| 4,881,135 | A |   | 11/1989 | Heilweil         |
| 4,907,973 | A |   | 3/1990  | Hon              |
| 4,998,215 | A |   | 3/1991  | Black et al.     |
| 5,059,126 | A |   | 10/1991 | Kimball          |
| 5,091,948 | A |   | 2/1992  | Kametani         |
| 5,093,730 | A |   | 3/1992  | Ishii et al.     |
| 5,115,967 | A |   | 5/1992  | Wedekind         |
| 5,136,563 | A |   | 8/1992  | Takemasa et al.  |

(Continued)

FOREIGN PATENT DOCUMENTS

CA          2386829          11/2002

(Continued)

OTHER PUBLICATIONS

"Kofax: Ascent Capture: Overview" [online], (date unknown), Kofax, [retrieved on Jan. 22, 2004]. Retrieved from the Internet: <URL http://www.kofax.com/products/ascent/capture>.

(Continued)

*Primary Examiner*—Edward L. Coles
*Assistant Examiner*—James A Thompson
(74) *Attorney, Agent, or Firm*—Fenwick & West LLP

(57) ABSTRACT

A system and method for a printer that can detect characteristics of a printed document and trigger an action in response, in addition to or instead of the action of printing the document.

20 Claims, 9 Drawing Sheets

U.S. PATENT DOCUMENTS

| | | |
|---|---|---|
| 5,170,935 A | 12/1992 | Federspiel et al. |
| 5,220,649 A | 6/1993 | Forcier |
| 5,231,698 A | 7/1993 | Forcier |
| 5,237,648 A | 8/1993 | Mills et al. |
| 5,270,989 A | 12/1993 | Kimura |
| 5,343,251 A | 8/1994 | Nafeh |
| 5,386,510 A | 1/1995 | Jacobs |
| 5,432,532 A | 7/1995 | Mochimaru et al. |
| 5,436,792 A | 7/1995 | Leman et al. |
| 5,438,426 A | 8/1995 | Miake et al. |
| 5,444,476 A | 8/1995 | Conway |
| 5,479,600 A | 12/1995 | Wroblewski et al. |
| 5,480,306 A | 1/1996 | Liu |
| 5,485,554 A | 1/1996 | Lowitz et al. |
| 5,493,409 A | 2/1996 | Maeda et al. |
| 5,568,406 A | 10/1996 | Gerber |
| 5,572,651 A | 11/1996 | Weber et al. |
| 5,576,950 A | 11/1996 | Tonomura et al. |
| 5,581,366 A | 12/1996 | Merchant et al. |
| 5,590,257 A | 12/1996 | Forcier |
| 5,596,698 A | 1/1997 | Morgan |
| 5,617,138 A | 4/1997 | Ito et al. |
| 5,624,265 A | 4/1997 | Redford et al. |
| 5,627,936 A | 5/1997 | Prasad et al. |
| 5,628,684 A | 5/1997 | Bouedec |
| 5,633,723 A | 5/1997 | Sugiyama et al. |
| 5,640,193 A | 6/1997 | Wellner |
| 5,661,506 A | 8/1997 | Lazzouni et al. |
| 5,661,783 A | 8/1997 | Assis |
| 5,682,330 A | 10/1997 | Seaman et al. |
| 5,682,540 A | 10/1997 | Klotz, Jr. et al. |
| 5,690,496 A | 11/1997 | Kennedy |
| 5,706,097 A | 1/1998 | Schelling et al. |
| 5,717,841 A | 2/1998 | Farrell et al. |
| 5,721,883 A | 2/1998 | Katsuo et al. |
| 5,729,665 A | 3/1998 | Gauthier |
| 5,749,735 A | 5/1998 | Redford et al. |
| 5,764,368 A | 6/1998 | Shibaki et al. |
| 5,774,260 A | 6/1998 | Petitto et al. |
| 5,793,869 A | 8/1998 | Claflin, Jr. |
| 5,804,803 A | 9/1998 | Cragun et al. |
| 5,845,144 A | 12/1998 | Tateyama et al. |
| 5,884,056 A | 3/1999 | Steele |
| 5,903,538 A | 5/1999 | Fujita et al. |
| 5,936,542 A | 8/1999 | Kleinrock et al. |
| 5,938,727 A | 8/1999 | Ikeda |
| 5,940,776 A | 8/1999 | Baron et al. |
| 5,941,936 A | 8/1999 | Taylor |
| 5,945,998 A | 8/1999 | Eick |
| 5,949,879 A | 9/1999 | Berson et al. |
| 5,962,839 A | 10/1999 | Eskildsen |
| 5,974,189 A | 10/1999 | Nicponski |
| 5,987,226 A | 11/1999 | Ishikawa et al. |
| 5,999,173 A | 12/1999 | Ubillos |
| 6,000,030 A | 12/1999 | Steinberg et al. |
| 6,006,241 A | 12/1999 | Purnaveja et al. |
| 6,020,916 A | 2/2000 | Gerszberg et al. |
| 6,038,567 A | 3/2000 | Young |
| 6,043,904 A * | 3/2000 | Nickerson .................. 358/442 |
| 6,076,733 A | 6/2000 | Wilz, Sr. et al. |
| 6,076,734 A | 6/2000 | Dougherty et al. |
| 6,081,261 A | 6/2000 | Wolff et al. |
| 6,098,106 A | 8/2000 | Philyaw et al. |
| 6,106,457 A | 8/2000 | Perkins et al. |
| 6,108,656 A | 8/2000 | Durst et al. |
| 6,111,567 A | 8/2000 | Savchenko et al. |
| 6,115,718 A | 9/2000 | Huberman et al. |
| 6,118,888 A | 9/2000 | Chino et al. |
| 6,123,258 A * | 9/2000 | Iida ............................. 235/375 |
| 6,125,229 A | 9/2000 | Dimitrova et al. |
| 6,138,151 A | 10/2000 | Reber et al. |
| 6,148,094 A | 11/2000 | Kinsella |
| 6,152,369 A | 11/2000 | Wilz, Sr. et al. |
| 6,153,667 A | 11/2000 | Howald |
| 6,167,033 A | 12/2000 | Chang et al. |
| 6,170,007 B1 | 1/2001 | Venkatraman et al. |
| 6,175,489 B1 | 1/2001 | Markow et al. |
| 6,189,009 B1 | 2/2001 | Stratigos et al. |
| 6,193,658 B1 | 2/2001 | Wendelken et al. |
| 6,199,042 B1 | 3/2001 | Kurzweil |
| 6,256,638 B1 | 7/2001 | Dougherty et al. |
| 6,296,693 B1 | 10/2001 | McCarthy |
| 6,297,812 B1 | 10/2001 | Ohara et al. |
| 6,297,851 B1 | 10/2001 | Taubman et al. |
| 6,298,145 B1 | 10/2001 | Zhang et al. |
| 6,302,527 B1 | 10/2001 | Walker |
| 6,307,956 B1 | 10/2001 | Black |
| 6,308,887 B1 | 10/2001 | Korman et al. |
| 6,330,976 B1 | 12/2001 | Dymetman et al. |
| 6,360,057 B1 | 3/2002 | Tsumagari et al. |
| 6,369,811 B1 | 4/2002 | Graham et al. |
| 6,373,498 B1 | 4/2002 | Abgrall |
| 6,373,585 B1 | 4/2002 | Mastie et al. |
| 6,375,298 B2 | 4/2002 | Purcell et al. |
| 6,378,070 B1 | 4/2002 | Chan et al. |
| 6,417,435 B2 | 7/2002 | Chantzis et al. |
| 6,421,738 B1 | 7/2002 | Ratan et al. |
| 6,439,465 B1 | 8/2002 | Bloomberg |
| 6,442,336 B1 | 8/2002 | Lemelson |
| 6,452,615 B1 | 9/2002 | Chiu et al. |
| 6,466,534 B2 | 10/2002 | Cundiff, Sr. |
| 6,476,793 B1 | 11/2002 | Motoyama et al. |
| 6,476,834 B1 | 11/2002 | Doval et al. |
| 6,502,114 B1 | 12/2002 | Forcier |
| D468,277 S | 1/2003 | Sugiyama |
| 6,502,756 B1 | 1/2003 | Fåhraeus |
| 6,504,620 B1 | 1/2003 | Kinjo |
| 6,515,756 B1 | 2/2003 | Mastie et al. |
| 6,519,360 B1 | 2/2003 | Tanaka |
| 6,529,920 B1 | 3/2003 | Arons et al. |
| 6,535,639 B1 | 3/2003 | Uchihachi et al. |
| 6,544,294 B1 | 4/2003 | Greenfield et al. |
| 6,552,743 B1 | 4/2003 | Rissman |
| 6,556,241 B1 | 4/2003 | Yoshimura et al. |
| 6,568,595 B1 | 5/2003 | Russell et al. |
| 6,581,070 B1 | 6/2003 | Gibbon et al. |
| 6,587,859 B2 | 7/2003 | Dougherty et al. |
| 6,593,860 B2 | 7/2003 | Lai et al. |
| 6,594,377 B1 | 7/2003 | Kim et al. |
| 6,611,276 B1 | 8/2003 | Muratori et al. |
| 6,611,622 B1 | 8/2003 | Krumm |
| 6,611,628 B1 | 8/2003 | Sekiguchi et al. |
| 6,625,334 B1 | 9/2003 | Shiota et al. |
| 6,647,534 B1 | 11/2003 | Graham |
| 6,647,535 B1 | 11/2003 | Bozdagi et al. |
| 6,654,887 B2 | 11/2003 | Rhoads |
| 6,665,092 B2 | 12/2003 | Reed |
| 6,674,538 B2 | 1/2004 | Takahashi |
| 6,678,389 B1 | 1/2004 | Sun et al. |
| 6,687,383 B1 | 2/2004 | Kanevsky et al. |
| 6,700,566 B2 | 3/2004 | Shimoosawa et al. |
| 6,701,369 B1 | 3/2004 | Philyaw |
| 6,724,494 B1 | 4/2004 | Danknick |
| 6,728,466 B1 | 4/2004 | Tanaka |
| 6,745,234 B1 | 6/2004 | Philyaw et al. |
| 6,750,978 B1 | 6/2004 | Marggraff et al. |
| 6,753,883 B2 | 6/2004 | Schena et al. |
| 6,771,283 B2 | 8/2004 | Carro |
| 6,772,947 B2 | 8/2004 | Shaw |
| 6,774,951 B2 | 8/2004 | Narushima |
| 6,775,651 B1 | 8/2004 | Lewis et al. |
| 6,807,303 B1 | 10/2004 | Kim et al. |
| 6,824,044 B1 | 11/2004 | Lapstun et al. |
| 6,845,913 B2 | 1/2005 | Madding et al. |

| | | | | | | |
|---|---|---|---|---|---|---|
| 6,853,980 B1 * | 2/2005 | Ying et al. .................. 705/27 | | 2003/0025951 A1 | 2/2003 | Pollard et al. |
| 6,856,415 B1 | 2/2005 | Simchik et al. | | 2003/0038971 A1 | 2/2003 | Renda |
| 6,871,780 B2 | 3/2005 | Nygren et al. | | 2003/0051214 A1 | 3/2003 | Graham et al. |
| 6,877,134 B1 | 4/2005 | Fuller et al. | | 2003/0065925 A1 | 4/2003 | Shindo et al. |
| 6,883,162 B2 | 4/2005 | Jackson et al. | | 2003/0076521 A1 | 4/2003 | Li et al. |
| 6,886,750 B2 | 5/2005 | Rathus et al. | | 2003/0084462 A1 | 5/2003 | Kubota et al. |
| 6,892,193 B2 | 5/2005 | Bolle et al. | | 2003/0088582 A1 | 5/2003 | Pflug |
| 6,898,709 B1 | 5/2005 | Teppler | | 2003/0093384 A1 | 5/2003 | Durst et al. |
| 6,904,168 B1 * | 6/2005 | Steinberg et al. ............. 382/165 | | 2003/0110926 A1 | 6/2003 | Sitrick et al. |
| 6,923,721 B2 | 8/2005 | Luciano et al. | | 2003/0117652 A1 | 6/2003 | Lapstun |
| 6,931,594 B1 | 8/2005 | Jun | | 2003/0121006 A1 | 6/2003 | Tabata et al. |
| 6,938,202 B1 | 8/2005 | Matsubayashi et al. | | 2003/0128877 A1 | 7/2003 | Nicponski |
| 6,946,672 B1 | 9/2005 | Lapstun et al. | | 2003/0160898 A1 | 8/2003 | Baek et al. |
| 6,950,623 B2 | 9/2005 | Brown et al. | | 2003/0177240 A1 | 9/2003 | Gulko et al. |
| 6,964,374 B1 | 11/2005 | Djuknic et al. | | 2003/0187642 A1 | 10/2003 | Ponceleon et al. |
| 6,966,495 B2 | 11/2005 | Lynggaard et al. | | 2003/0220988 A1 | 11/2003 | Hymel |
| 6,983,482 B2 | 1/2006 | Morita et al. | | 2003/0231198 A1 | 12/2003 | Janevski |
| 7,000,193 B1 | 2/2006 | Impink, Jr. et al. | | 2004/0024643 A1 | 2/2004 | Pollock et al. |
| 7,023,459 B2 | 4/2006 | Arndt et al. | | 2004/0036842 A1 | 2/2004 | Tsai et al. |
| 7,031,965 B1 | 4/2006 | Moriya et al. | | 2004/0039723 A1 | 2/2004 | Lee et al. |
| 7,075,676 B2 | 7/2006 | Owen | | 2004/0044894 A1 | 3/2004 | Lofgren et al. |
| 7,079,278 B2 | 7/2006 | Sato | | 2004/0049681 A1 | 3/2004 | Diehl et al. |
| 7,089,420 B1 | 8/2006 | Durst et al. | | 2004/0118908 A1 | 6/2004 | Ando et al. |
| 7,092,568 B2 * | 8/2006 | Eaton .................. 382/181 | | 2004/0125402 A1 | 7/2004 | Kanai et al. |
| 7,131,058 B1 | 10/2006 | Lapstun | | 2004/0128514 A1 | 7/2004 | Rhoads |
| 7,134,016 B1 | 11/2006 | Harris | | 2004/0128613 A1 | 7/2004 | Sinisi |
| 7,149,957 B2 | 12/2006 | Hull et al. | | 2004/0143459 A1 | 7/2004 | Engelson et al. |
| 7,151,613 B1 | 12/2006 | Ito | | 2004/0143602 A1 | 7/2004 | Ruiz et al. |
| 7,152,206 B1 | 12/2006 | Tsuruta | | 2004/0156616 A1 | 8/2004 | Strub et al. |
| 7,162,690 B2 | 1/2007 | Gupta et al. | | 2004/0167895 A1 | 8/2004 | Carro |
| 7,174,151 B2 | 2/2007 | Lynch et al. | | 2004/0184064 A1 | 9/2004 | TaKeda et al. |
| 7,181,502 B2 | 2/2007 | Incertis | | 2004/0207876 A1 | 10/2004 | Aschenbrenner et al. |
| 7,196,808 B2 * | 3/2007 | Kofman et al. ............. 358/1.15 | | 2004/0215470 A1 | 10/2004 | Bodin |
| 7,215,436 B2 | 5/2007 | Hull et al. | | 2004/0229195 A1 | 11/2004 | Marggraff et al. |
| 7,228,492 B1 | 6/2007 | Graham | | 2004/0240541 A1 | 12/2004 | Chadwick et al. |
| 7,263,659 B2 | 8/2007 | Hull et al. | | 2004/0249650 A1 | 12/2004 | Freedman et al. |
| 7,263,671 B2 | 8/2007 | Hull et al. | | 2005/0038794 A1 | 2/2005 | Piersol |
| 7,280,738 B2 | 10/2007 | Kauffman et al. | | 2005/0064935 A1 | 3/2005 | Blanco |
| 7,298,512 B2 | 11/2007 | Reese et al. | | 2005/0083413 A1 | 4/2005 | Reed et al. |
| 2001/0003846 A1 | 6/2001 | Rowe et al. | | 2005/0149849 A1 | 7/2005 | Graham et al. |
| 2001/0017714 A1 | 8/2001 | Komatsu et al. | | 2005/0213153 A1 | 9/2005 | Hull et al. |
| 2001/0037408 A1 | 11/2001 | Thrift et al. | | 2005/0216838 A1 | 9/2005 | Graham |
| 2001/0052942 A1 | 12/2001 | MacCollum et al. | | 2005/0216852 A1 | 9/2005 | Hull et al. |
| 2002/0001101 A1 | 1/2002 | Hamura et al. | | 2006/0043193 A1 | 3/2006 | Brock |
| 2002/0004807 A1 | 1/2002 | Graham et al. | | 2006/0136343 A1 | 6/2006 | Coley et al. |
| 2002/0006100 A1 | 1/2002 | Cundiff, Sr. et al. | | 2006/0171559 A1 | 8/2006 | Rhoads |
| 2002/0010641 A1 | 1/2002 | Stevens et al. | | 2007/0033419 A1 | 2/2007 | Kocher et al. |
| 2002/0011518 A1 | 1/2002 | Goetz et al. | | 2007/0065094 A1 | 3/2007 | Chien et al. |
| 2002/0015066 A1 | 2/2002 | Siwinski et al. | | 2007/0268164 A1 | 11/2007 | Lai et al. |
| 2002/0023957 A1 | 2/2002 | Michaelis et al. | | 2008/0037043 A1 | 2/2008 | Hull et al. |
| 2002/0048224 A1 | 4/2002 | Dygert et al. | | | | |
| 2002/0051010 A1 | 5/2002 | Jun et al. | | | | |

FOREIGN PATENT DOCUMENTS

| | | |
|---|---|---|
| CN | 1352765 A | 6/2002 |
| CN | 1097394 C | 12/2002 |
| EP | 1133170 A2 | 9/2001 |
| WO | WO 99/18523 | 4/1999 |
| WO | WO 02/082316 A1 | 10/2002 |

OTHER PUBLICATIONS

"PostScript Language Document Structuring Conventions Specification", Version 3.0 (Sep. 25, 1992), Adobe Systems Incorporated.

ASCII 24.com, [online] (date unknown), Retrieved from the Internet<URL: http://216.239.37.104/search?q=cache:z-G9M1EpvSUJ:ascii24.com/news/i/hard/article/1998/10/01/612952-000.html+%E3%82%B9%E3 . . . >.

Configuring A Printer (NT), Oxford Computer Support [online] [Retrieved on Nov. 13, 2003] Retrieved from the Internet<URL: http://www.nox.ac.uk/cehoxford/ccs/facilities/printers/configtnt.htm>.

"DocumentMall Secure Document Management" [online] [Retrieved on Mar. 9, 2004). Retrieved from the Internet <URL: http://www.documentmall.com>.

Girgensohn, Andreas et al., "Time-Constrained Keyframe Selection Technique," Multimedia Tools and Applications (2000), vol. 11, pp. 347-358.

Graham, Jamey et al., "A Paper-Based Interface for Video Browsing and Retrieval," IEEE International Conference on Multimedia and Expo (Jul. 6-9, 2003), vol. 2, P:II 749-752.

Graham, Jamey et al., "The Video Paper Multimedia Playback System," Proceedings of the 11th ACM International Conference on Multimedia (Nov. 2003), pp. 94-95.

Graham, Jamey et al., "Video Paper: A Paper-Based Interface for Skimming and Watching Video," International Conference on Consumer Electronics (Jun. 16-18, 2002), pp. 214-215.

Hull, Jonathan J. et al., "Visualizing Multimedia Content on Paper Documents: Components of Key Frame Selection for Video Paper," Proceedings of the 7th International Conference on Document Analysis and Recognition (2003), vol. 1, pp. 389-392.

Label Producer by Maxell, [online] [Retrieved on Nov. 11, 2003]. Retrieved from the Internet<URL: http://www.maxell.co.jp/products/consumer/rabel_card/>.

Movie-PhotoPrint by Canon, [online] [Retrieved on Nov. 11, 2003]. Retrieved from the Internet<URL: http://cweb.canon.jp/hps/guide/rimless.html>.

Print From Cellular Phone by Canon, [online] [Retrieved on Nov. 11, 2003]. Retrieved from the Internet<URL: http://cweb.canon.jp/bj/enjoy/pbeam/index.html>.

Print Images Plus Barcode by Fuji Xerox, [online] [Retrieved on Nov. 11, 2003]. Retrieved from the Internet<URL: http://www.fujixerox.co.jp/soft/cardgear/release.html>.

Print Scan-Talk By Barcode by Epson, [online] [Retrieved on Nov. 11, 2003]. Retrieved from the Internet<URL: http://www.epson.co.jp/osirase/2000/000217.htm>.

Printer With CD/DVD Tray, Print CD/DVD Label by Epson, [online] [Retrieved on Nov. 11, 2003]. Retrieved from the Internet<URL: http://www.i-love-epson.co.jp/products/printer/inkjet/pmd750/pmd7503.htm>.

R200 ScanTalk [online] (date unknown). Retrieved from the Internet<URL: http://homepage2.nifty.com/vasolza/ScanTalk.htm>.

Variety of Media In, Print Paper Out by Epson, [online] [Retrieved on Nov. 11, 2003]. Retrieved from the Internet<URL: http://www.i-love-epson.co.jp/products/spc/pma850/pma8503.htm>.

Gopal, S. et al., "Load Balancing in a Heterogeneous Computing Environment," Proceedings of the Thirty-First Hawaii International Conference on System Sciences, Jan. 6-9, 1998.

Gropp, W. et al., "Using MPI—Portable Programming with the Message-Passing Interface," copyright 1999, pp. 35-42, second edition, MIT Press.

"Seiko Instruments USA, Inc.—Business and Home Office Products" online, date unknown, Seiko Instruments USA, Inc., [retrieved on Jan. 25, 2005]. Retrieved from the Internet: <URL: http://www.siibusinessproducts.com/products/link-ir-p-html>.

"Tasty FotoArt" [online], date unknown, Tague Technologies, Inc., [retrieved on Mar. 8, 3005]. Retrieved from the Internet: <URL: http//www.tastyfotoart.com>.

Gropp, W. et al.; "Using MPI-Portable Programming with the Message Passing Interface," copyright 1999, pp. 35-42, second edition, MIT Press.

Poon, K.M. et al., "Performance Analysis of Median Filtering on Meiko™—A Distributed Multiprocessor System," IEEE First International Conference on Algorithms and Architectures for Parallel Processing, 1995, pp. 631-639.

Dimitrova, N. et al., "Applications of Video-Content Analysis and Retrieval," IEEE Multimedia, Jul.-Sep. 2002, pp. 42-55.

European Search Report, EP 04255836, Sep. 12, 2006, 4 pages.
European Search Report, EP 04255837, Sep. 5, 2006, 3 pages.
European Search Report, EP 04255839, Sep. 4, 2006, 3 pages.
European Search Report, EP 04255840, Sep. 12, 2006, 3 pages.

Graham, J. et al., "A Paper-Based Interface for Video Browsing and Retrieval," ICME '03, Jul. 6-9, 2003, pp. 749-752, vol. 2.

Graham, J. et al., "Video Paper: A Paper-Based Interface for Skimming and Watching Video," ICCE '02, Jun. 18-20, 2002, pp. 214-215.

Klemmer, S.R. et al., "Books With Voices: Paper Transcripts as a Tangible Interface to Oral Histories," CHI Letters, Apr. 5-10, 2003, pp. 89-96, vol. 5, Issue 1.

Minami, K. et al., "Video Handling with Music and Speech Detection," IEEE Multimedia, Juy-Sep. 1998, pp. 17-25.

Shahraray, B. et al, "Automated Authoring of Hypermedia Documents of Video Programs," ACM Multimedia '95 Electronic Proceedings, San Francisco, CA, Nov. 5-9, 1995, pp. 1-12.

Shahraray, B. et al., "Pictorial Transcripts: Multimedia Processing Applied to Digital Library Creation," IEEE, 1997, pp. 581-586.

Lamming, M. et al., "Using Automatically Generated Descriptions of Human Activity to Index Multi-media Data," IEEE Multimedia Communications and Applications IEE Colloquium, Feb. 7, 1991, pp. 5/1-5/3.

ASCII 24.com, [online] (date unknown), Retrieved from the Internet<URL: http://216.239.37.104/search?q=cache:z-G9M1EpvSUJ:ascii24.com/news/i/hard/article/1998/10/01/612952-000.html+%E3%82%B9%E3% . . . >.

Label Producer by Maxell, [online] [Retrieved on Nov. 11, 2003]. Retrieved from the Internet<URL: http://www.maxell.co.jp/products/consumer/rabel_card/>.

Movie-PhotoPrint by Canon, [online] [Retrieved on Nov. 11, 2003]. Retrieved from the Internet<URL: http://cweb.canon.jp/hps/guide/rimless.html>.

Print From Cellular Phone by Canon, [online] [Retrieved on Nov. 11, 2003]. Retrieved from the Internet<URL: http://cweb.canon.jp/bj/enjoy/pbeam/index.html>.

Print Images Plus Barcode by Fuji Xerox, [online] [Retrieved on Nov. 11, 2003]. Retrieved from the Internet<URL: http://www.fujixerox.co.jp/soft/cardgear/release.html>.

Print Scan-Talk By Barcode by Epson, [online] [Retrieved on Nov. 11, 2003]. Retrieved from the Internet<URL: http://epson.co.jp/osirase/2000/000217.htm>.

Printer With CD/DVD Tray, Print CD/DVD Label by Epson, [online] [Retrieved on Nov. 11, 2003]. Retrieved from the Internet<URL: http://www.i-love-epson.co.jp/products/printer/inkjet/pmd750/pmd7503.htm>.

R200 ScanTalk [online] (date unknown). Retrieved from the Internet<URL: http://homepage2.nifty.com/vasolza/ScanTalk.htm>.

Variety of Media In, Print Paper Out by Epson, [online] [Retrieved on Nov. 11, 2003]. Retrieved from the Internet<URL: http://www.i-love-epson.co.jp/products/spc/pma850/pma8503.htm>.

Communication Pursuant to Article 96(2) EPC, European Application No. 04255836.1, Jun. 11, 2007, 10 pages.

Stifelman, L. et al., "The Audio Notebook,"SIGCHI 2001, Mar. 31-Apr. 5, 2001, pp. 182-189, vol. 3, No. 1, Seattle, WA.

Chinese Application No. 2004100849823 Office Action, Jun. 1, 2007, 24 pages.

Chinese Application No. 2004100897988 Office Action, Apr. 6, 2007, 8 pages.

Arai, T. et al., "PaperLink: A Technique for Hyperlinking from Real Paper to Electronic Content," CHI 97, Atlanta, GA, Mar. 22-27, 1997, pp. 327-334.

Dorai, C. et al., "End-to-End VideoText Recognition for Multimedia Content Analysis," IEEE, International Conference on Multimedia and Expo, Aug. 2001, pp. 601-604.

Hecht, D.L., "Printed Embedded Data Graphical User Interfaces," Computer, Mar. 2001, pp. 47-55, vol. 34, Issue 3.

Klemmer, S.R. et al., "Books with Voices: Paper Transcripts as a Tangible Interface to Oral Histories," CHI 2003, Fort Lauderdale, FL, Apr. 5-10, 2003, pp. 89-96.

Karasik, D., "Image Processing in Perl Graphic Applications," Google, Apr. 2, 2003, pp. 1-12.

* cited by examiner

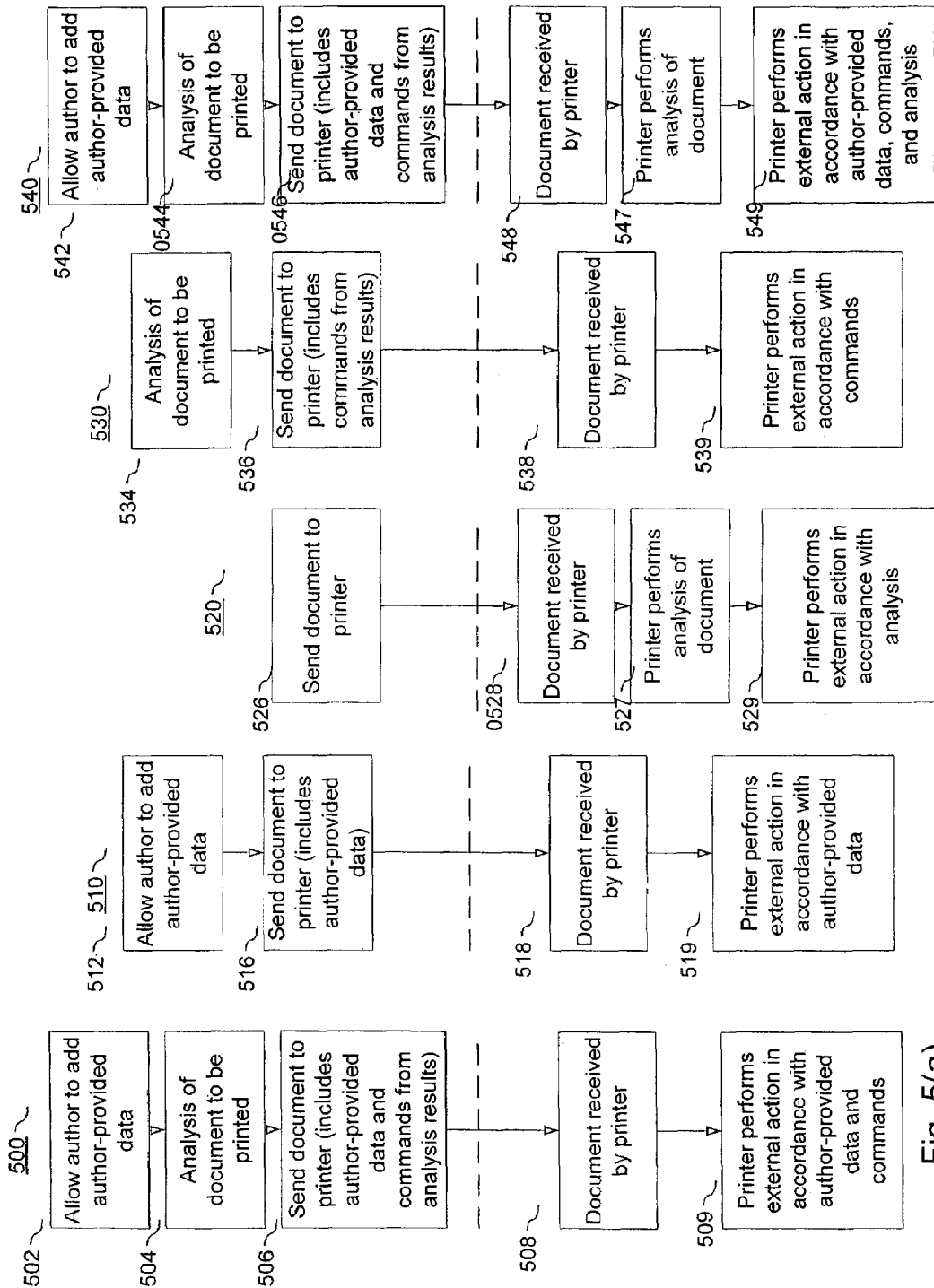

PRINTER WITH DOCUMENT-TRIGGERED PROCESSING

CROSS-REFERENCES TO RELATED APPLICATIONS

The present application claims priority under 35 U.S.C. § 119(e) to:
1) U.S. Provisional patent application entitled "Printer Including One or More Specialized Hardware Devices" filed on Sep. 25, 2003, having Ser. No. 60/506,303, and
2) U.S. Provisional patent application entitled "Printer Including Interface and Specialized Information Processing Capabilities" filed on Sep. 25, 2003, having Ser. No. 60/506,302.

Both provisional applications are herein incorporated by reference in their entirety.

The following patent applications are related to the present application and are incorporated by reference herein in their entirety:
1) U.S. patent application Ser. No. 10/814,931, filed Mar. 30, 2004, of Hart et al., entitled "Printer Having Embedded Functionality for Printing Time-Based Media".
2) U.S. patent application Ser. No. 10/814,700, filed Mar. 30, 2004, of Hart et al., entitled "Printer User Interface".
3) U.S. patent application Ser. No. 10/814,932, filed Mar.30, 2004, of Hart et al., entitled "Printer With Hardware and Software Interface for Media Devices".

BACKGROUND OF THE INVENTION

1. Field of the Invention

The present invention relates to document printers and, more specifically, to systems and methods that can detect characteristics or content of a printed document and trigger an action in response.

2. Description of the Background Art

Conventional printers receive documents in a variety of formats and print the contents of the documents in accordance with a proper format. For example, a printer enabled to print PostScript documents will correctly interpret Postscript commands within a document so that the document has the appearance expected by its author when it is printed. (Postscript is a trademark of Adobe Systems Incorporated).

Today, as more and more electrical databases and computer networks are interconnected, people often have multiple data systems and destinations in which to store information. For example, a person may receive an email containing information that he wants to retain. The person may want to print some or all of the information. The person may further want to add the information to a database or to send the information to other people or destinations or to add the information to a web page. Currently, the person will need to execute several different software programs and will need to type multiple commands into the programs. He may also need to re-enter the information into one or more programs. This is not efficient and is prone to human error, since human beings occasionally forget to perform one of more of the tasks usually associated with a received document and are also prone to typographical errors.

Some conventional printers incorporate a management function in which the printer monitors its own internal functions and "phones home" for assistance if, for example, its toner is low or it is out of paper. This action is based on the printer doing "self-monitoring," not on any monitoring of the documents to be printed.

What is needed is a printer and method that can take various actions (in addition to printing) depending on the content and characteristics of a document that is sent to it.

SUMMARY OF THE INVENTION

The present invention overcomes the deficiencies and limitations of the prior art by providing a system and method for a printer that can detect characteristics of a printed document and trigger an action in response, in addition to or instead of the action of printing the document. For example, such a printer could extract the fields and values in an electronic form and store that information in a database. This system can also create a paper document that reflects some aspect of the action executed by the printer.

The action is preferably based on content of the document received by the printer. This content can include printable and non-printable data. In certain embodiments, the document is analyzed by a data processing system before it is sent to be printed and additional data is added to or coupled with the document. In one embodiment, an author or other user provides additional information, such as the name of a database. In another embodiment, software on the data processing system analyzes the document and provides additional information about its content, such as the content of certain data fields. In yet another embodiment, the document is analyzed after the printer receives it. In all of these embodiments, the printer performs an action (in addition to or instead of printing) in accordance with the content of the document.

In certain embodiments, the printer and/or an associated printer-side component interact with the user or with the document source before the printer performs the action in accordance with the content of the document.

BRIEF DESCRIPTION OF THE DRAWINGS

The invention is illustrated by way of example, and not by way of limitation in the figures of the accompanying drawings in which like reference numerals refer to similar elements.

FIG. 5(a) is a flowchart corresponding to an embodiment of FIG. 3(a).

FIG. 5(b) is a flowchart corresponding to an embodiment of FIG. 3(b).

FIG. 5(c) is a flowchart corresponding to an embodiment of FIG. 3(c).

FIG. 5(d) is a flowchart corresponding to an embodiment of FIG. 3(d).

FIG. 5(e) is a flowchart corresponding to an embodiment of the present invention.

DETAILED DESCRIPTION OF PREFERRED EMBODIMENTS

Figure 1A:
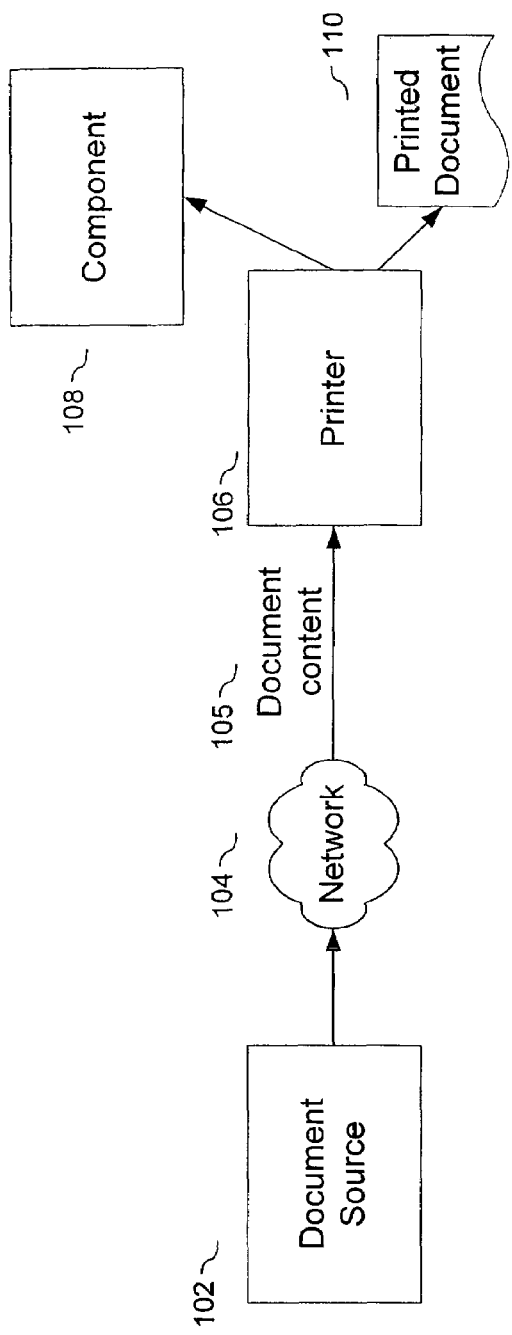
FIG. 1(a) is a block diagram showing a system usable in connection with the present invention.

A method and apparatus for performing at least one action (besides printing) based on the content of a printed document is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment," "certain embodiments" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages and Page Description Languages (PDLs) may be used to implement the teachings of the invention as described herein.

Moreover, the present invention is claimed below operating on or working in conjunction with an information system. Such an information system as claimed may be the entire messaging system as detailed below in the preferred embodiment or only portions of such a system. Thus, the present invention is capable of operating with any information system from those with minimal functionality to those providing all the functionality disclosed herein. FIG. 1(a) is a block diagram showing a system usable in connection with the present invention. A document having document content 105 is sent from a document source 102 to a printer 106. As used herein, the term "content" refers to anything in the print stream sent to the printer, including both printing and non-printing data. In the Figure, the document is sent over a network 104, such as the Internet, an intranet, a wireless connection, a wide area network, or the like. Printer 106 receives the document and performs an action based on the content of the document. One example of such an action is to send data to a component 108. In certain embodiments, printer 106 also prints the document 110. The action performed may be any of a number of actions, such as entering data in a database, sending a notification or confirmation, adding data to a web page, etc. Examples of actions performed in accordance with content of the document are discussed in further detail below.

Figure 1B:
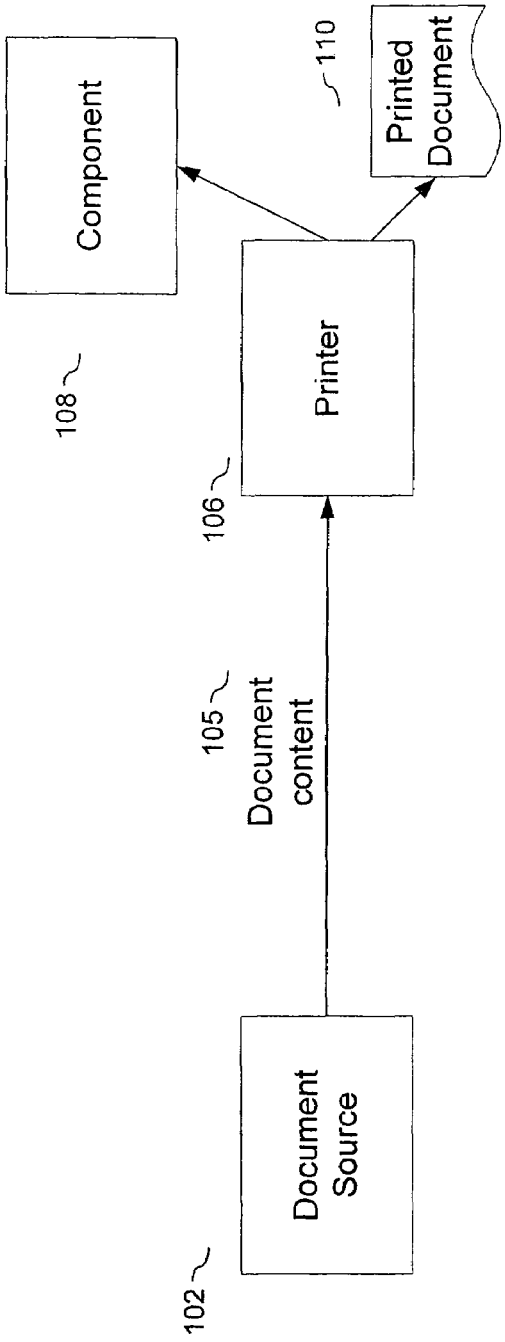
FIG. 1(b) is a block diagram showing a system usable in connection with the present invention.

FIG. 1(b) is a block diagram showing a system usable in connection with the present invention. In this example, document source 102 is connected to printer 106 without a network connection. Similarly, printer 106 is connected to component 108 without a network connection.

Figure 1C:
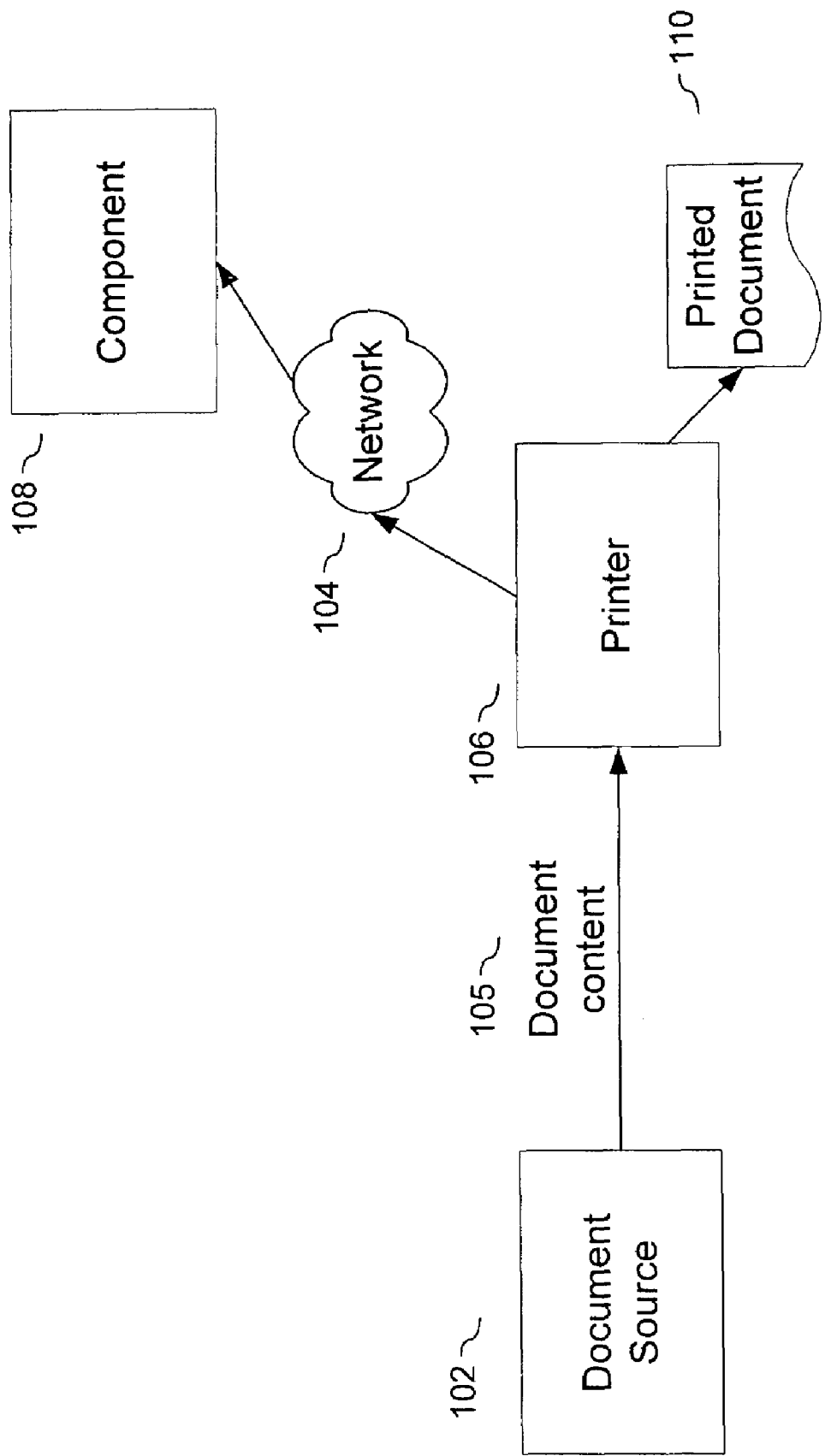
FIG. 1(c) is a block diagram showing a system usable in connection with the present invention.

FIG. 1(c) is a block diagram showing a system usable in connection with the present invention. In this example, printer 106 is connected to component 108 using a network connection through network 104. Network 104 can be any network, such as the Internet, an intranet, a wireless connection, a wide area network, or the like.

It will be understood that the system configurations shown in FIGS. 1(a)-1(c) are examples only and are included to show some configurations usable with the present invention. It will be understood that other configurations are possible. For example, the connections between the document source and the printer and between the printer and component 108 can both be network connections.

Figure 2A:
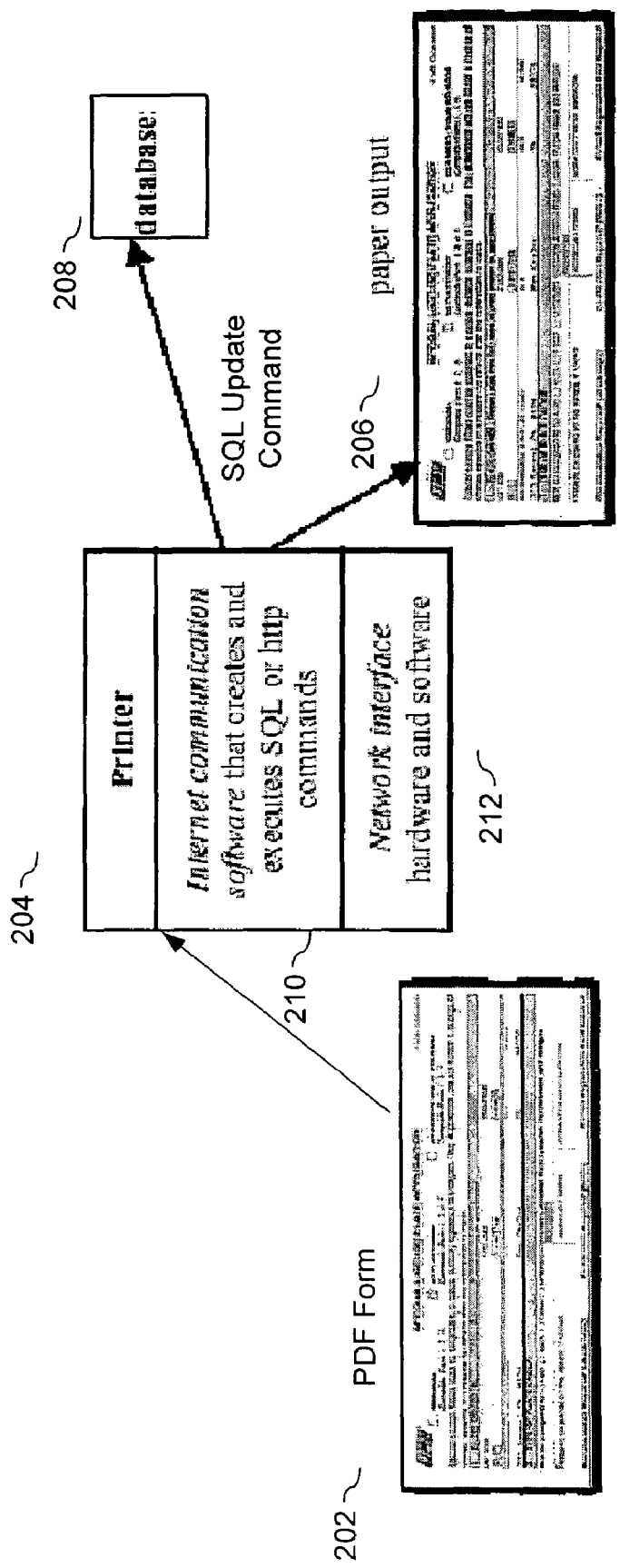
FIG. 2A shows an embodiment of the present invention for printing a PDF form and making an entry based on content of the form into a database.

FIG. 2 shows an embodiment of the present invention in which a printer 204 prints 206 a PDF form 202 and also performs an action, such as making an entry based on content of the form 202 into a database 208. For example, if form 202 is a form filled out by a user, the form is printed 206 and data in fields of the form are added to the user's record in database 208. In certain embodiments, fields of the document are extracted using a well-known API for Acrobat plug-ins that allows access to the fields of PDF files. In certain other embodiments, fields are extracted from HTML or XML documents using well-known techniques.

In this example, printer 204 communicates with database 208 over a network, although printer 204 could also have a direct connection to database 208. Database 208 can be external or internal to printer 204. In this example, printer 204 includes network interface hardware and software 212 required to communicate over a network. Printer 204 further includes Internet communication software 210 that creates and executes commands to communicate with the database. These commands are, for example, SQL commands, http commands, or similar commands, depending on the nature of database 208.

FIGS. 3(*a*)-3(*c*) show further implementations of a printer that receives a document and performs an action in accordance with content of the document. It will be understood that the components of these figures can be connected with or without a network connection and that any connection method enabling the communication described below falls within the sprit and scope of the present invention.

Author-Provided Data, Application Plug-In, Simple Document Processing by Printer FIG. 3(*a*) shows a first embodiment of the present invention for printing a paper document 306 and additionally performing an action 308. FIG. 5(*a*) shows a flow chart of a method used by this system. In FIG. 3(*a*), a data processing system 302 communicates with a printer 304. Data processing system 302 includes an initial copy of the document to be printed 322. This document 322 can have any appropriate format, including but not limited to ACSII text, Postscript, Microsoft Word, Adobe's pdf format, etc. This document optionally includes author-provided data, as discussed below (see 502). Data processing system 302 also includes a document rendering application 324, such as Acrobat Reader (available from Adobe Systems Incorporated). In this example, document rendering application 324 includes an application plug-in 325. Application plug-in 325, which may be supplied with a print driver, inspects every document printed by document rendering application 324 and preferably performs the following (see 504):

a. determines whether the document needs special processing and whether the document includes author-provided data, e.g., an identifier for a database that receives the content of a form (Note that "author-provided data" can be provided by any user with the capability to augment the document to be printed, not just the author of the document. For this reason, it is also referred to as "user-provided data".); and b. optionally applies processing, e.g., field extraction from forms or URL extraction from web pages, to produce application-derived data; and c. communicates author-provided data and application-derived data to the printer in a way that does not affect the appearance of the printed document (see 506).

Data processing system 302 then sends information to the printer using a format such as Postscript (see 508). This information is termed "Page Description Language" (PDL) because it describes the appearance and characteristics of a document to be printed. In this example, the PDL includes both author provided data (such as an identifier for a database that receives the content of a form) and data derived by application plug-in 325 (such as data extracted by the plug-in from fields in the document). It will be understood that the functionality of plug-in 325 could also be implemented as part of software 324, instead of as a plug-in.

The communication of data to the printer in a way that does not affect the appearance of the printed document described in step (c) above can be done by including the data as a non-printing comment field in the PDL file. This type of non-printing comment is currently allowed in Adobe Postscript or Hewlett-Packard's PCL. Often a long sequence of unlikely characters signals the presence of such data (see "Postscript Language Document Structuring Conventions Specification, Version 3.0," Sep. 25, 1992, http://partners.adobe.com/asn/developer/pdfs/tn/5001.DSC_Spec.pdf).

Using Postscript as an example, in which comments are indicated by two percent signs at the beginning of a line, data fields for a form that indicate the first and last names of an applicant could be indicated as:

%% RICOH-NEPV1.0-FORMITEM page=1 field="First Name" type="string" value=–"Jonathan"

%% RICOH-NEPV1.0-FORMITEM page=1 field="Last Name" type="string" value=–"Hull"

FIG. 3(*a*) further shows a printer 304 having document processing software 326. In this example, document processing software 326:

a. determines whether the document contains author-provided data, application-derived data, and whether any further processing should be applied to the document;

b. optionally processes the document to produce printer-derived data, e.g., a filter might be applied to postscript data that detects web URL's. In this document, processing by the printer is classified as simple or complex. In general, simple processing involves the printer executing a well-defined external command or recognizing regular expressions (such as URLs). Complex processing by the printer involves performing a content-based operation on the PDL.

In a preferred embodiment, the printer software 326 executes simple processing. It inspects the comments in the PDL file and when it finds:

%% RICOH-NEPV1.0-CONTENT-FILTER NO it determines that a content-based analysis of the PDL is not needed. Instead, a well-defined external command is executed.

c. decides and perform an action in accordance with the content of the received document, e.g., a pdf form might include author-provided data that specifies a web location for a database and application-derived data that includes form field identifiers and values. In this step the printer creates a database update command from this data and executes it. A simple example of a database update command to update the first and last name fields in a database would be a cgi call such as:

http://www.ca.dmv.gov/
   special_plate.cgi?last=Hull&first=Jonathan

In summary, in the system shown in FIG. 3(*a*), when the user executes a print command, the application processes the source document and creates a page description language (PDL) version of the document that includes the author-provided data and application-derived data computed by an application plug-in. Document processing software on the printer detects the presence of that information and decides whether it should compute additional printer-derived data from the PDL document. It also decides what action should be executed, as a function of the author-provided, application-derived, and printer-derived characteristics of the document.

In another embodiment, plug-in 325 generates non-printed commands in the print stream in a manner similar to that discussed below in connection with FIG. 3(*a*). In such an embodiment, the commands are generated by the plug-in, however, rather than by an author or user as discussed below.

In various embodiments, plug-in 325 generates commands causing the printer to do one or more of the following:

- Collect all form data from the print stream and insert it into a database;
- Perform arbitrary calculations and sending mail messages to a known address
- Detect web URLs in the document and instruct a company's web proxy server to pre-cache those pages or store an archival copy
- Download web URLs and print those web pages as an attachment to the document being printed.

Yet another embodiment contains either a modified web browser or a web browser with a plug-in in place of document rendering application 324. The modified browser inserts similar commands when HTML forms are printed.

In certain embodiments, the printed document 306 is modified to reflect the results of the action performed by the printer. For example, the document may be modified to contain a watermark that certifies that the data printed on the paper is exactly the same as the data that was uploaded into a database. In certain other embodiments, a certificate to this effect is printed along with the document. In certain other embodiments, an email is sent to the document source, document author, or other indicated party to this effect.

The following paragraphs discuss other implementations of the present invention.

Figure 3A:
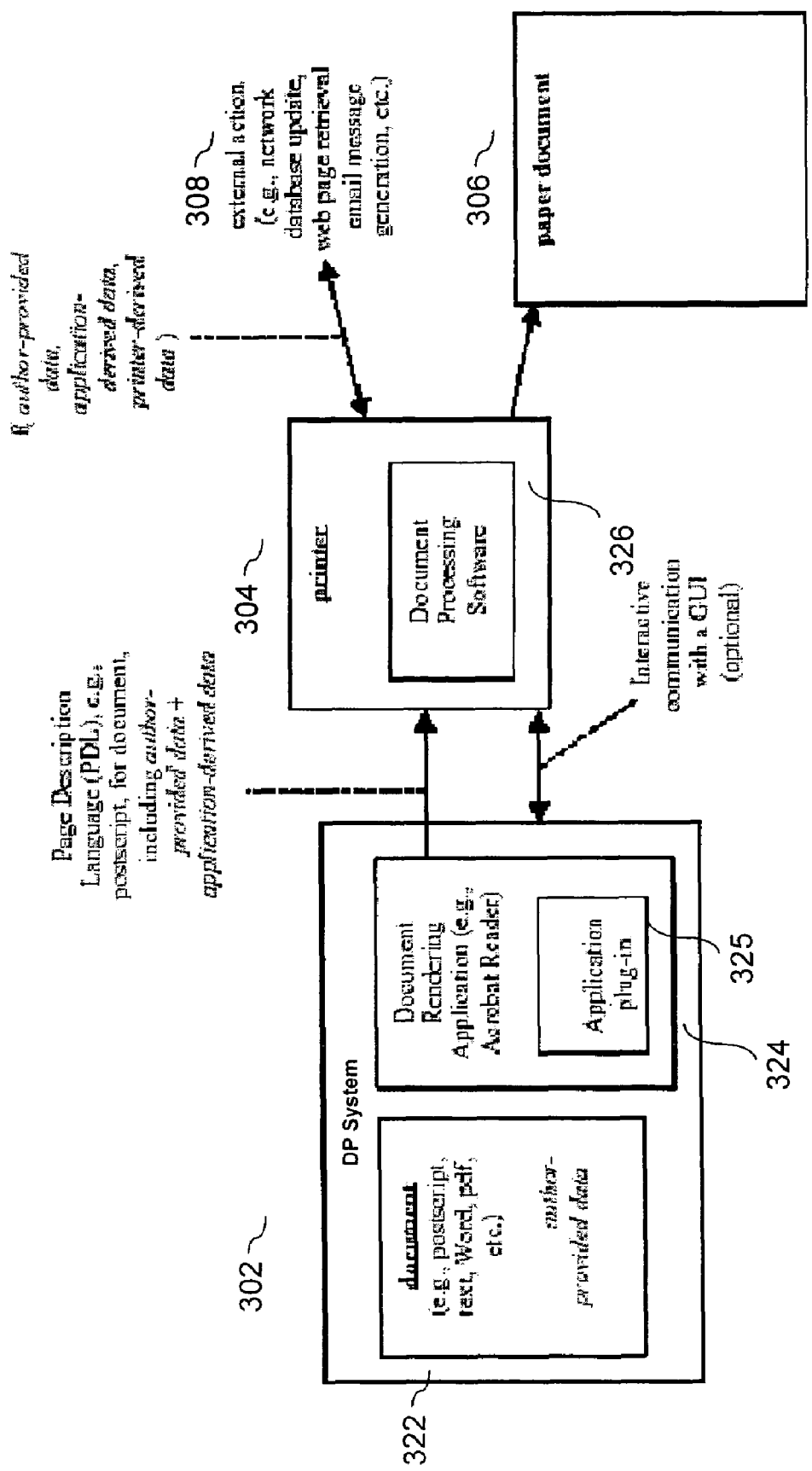
FIG. 3(a) shows a first embodiment of the present invention for printing a paper document and additionally performing an action.
Figure 3B:
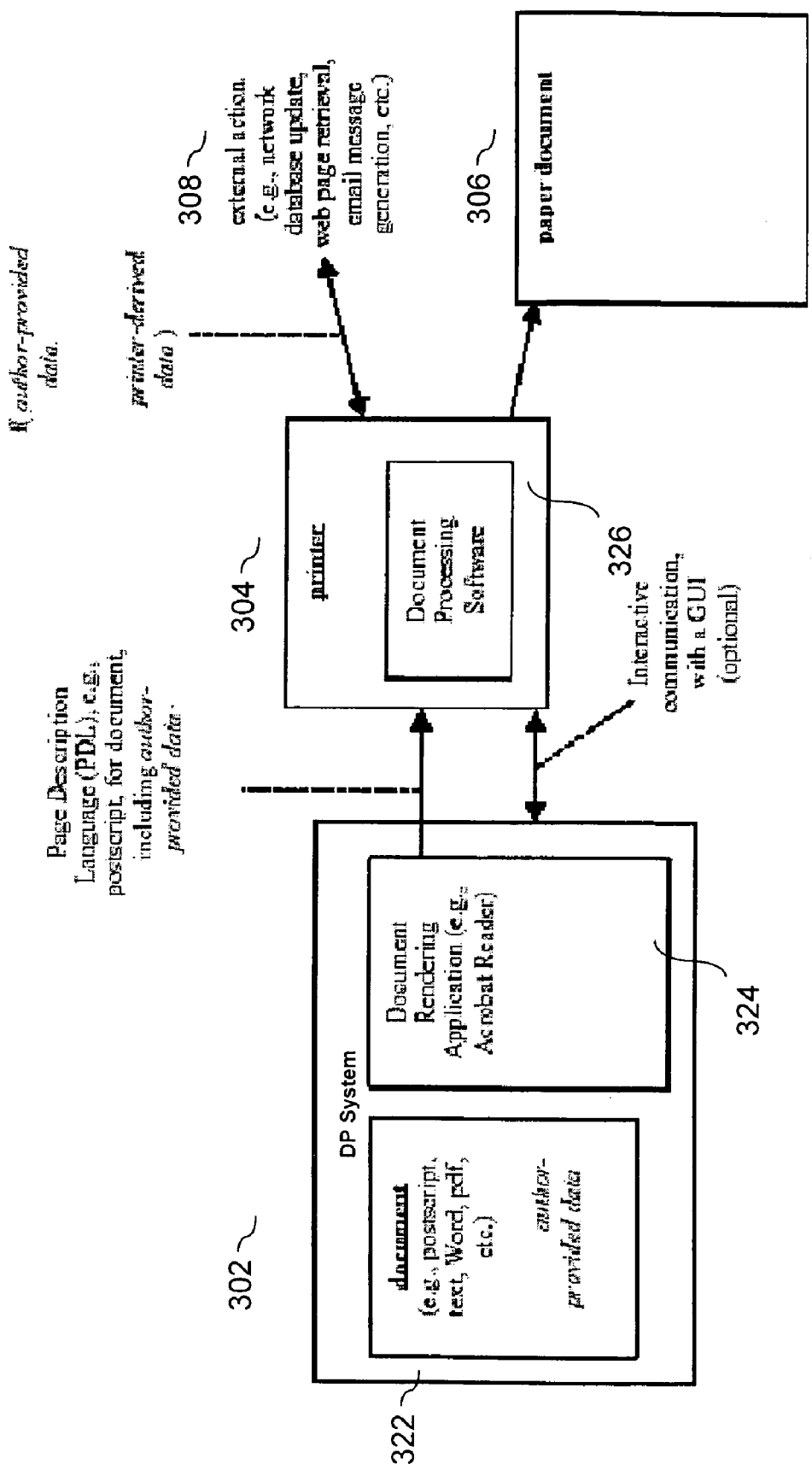
FIG. 3(b) shows a second embodiment of the present invention for printing a paper document and additionally performing an action.

Author-Provided Data, No Application Plug-In, Simple Document Processing by Printer FIG. 3(b) shows a second embodiment of the present invention for printing a paper document and additionally performing an action. FIG. 5(b) shows a flow chart of a method used by this system. In this example, the user again provides data (such as the name of a database to be updated), but the system does not require a plug-in for document rendering application 324. In this example, the author includes a command in a document to be printed by adding the command as a non-printing comment field in the document. This type of non-printing comment is currently allowed in, for example, Adobe Postscript and Hewlett-Packard's PCL printer language. In an embodiment of the invention, the user includes a command in the comments that indicates that the printer should email him when the document is printed. Thus, the action performed by the printer is the generation and sending of an email message to the user.

This implementation is useful in systems where data sent to the printer is commonly stored in a print queue. In such systems, the protocol does not allow for user interaction with the printer. Thus, any special communication must be embedded within the data initially sent to the printer. Ideally, the embedded data does not affect the print spooler or other forwarding device, while remaining easy for the printer to detect and parse. As an example, the user inserts the following PostScript metadata into the print stream. Note that this metadata has the format of a non-printing comment.

%% RICOH-NEPV1.0-EMAIL-UPON-PRINTING docname="Special Plate Application" time-queued="10: 11:37" dest="hull@rii.ricoh.com"

The above example indicates a document name, e.g., "Special Plate Application" and an email address where notification of printing is to be emailed: hull@rii.ricoh.com.

Document processing software 326 of printer 304 looks for commands within the print stream and processes them. Thus, in the above example, software 326 would send an email message to hull@rii.ricoh.com when this document is printed. Other examples of actions taken by printer 304 in various embodiments include one or more of the following:

- Collect all form data from the print stream and insert it into a database;
- Perform arbitrary calculations and sending mail messages to a known address
- Detect web URLs in the document and instruct a company's web proxy server to pre-cache those pages or store an archival copy
- Download web URLs and print those web pages as an attachment to the document being printed.

Figure 3C:
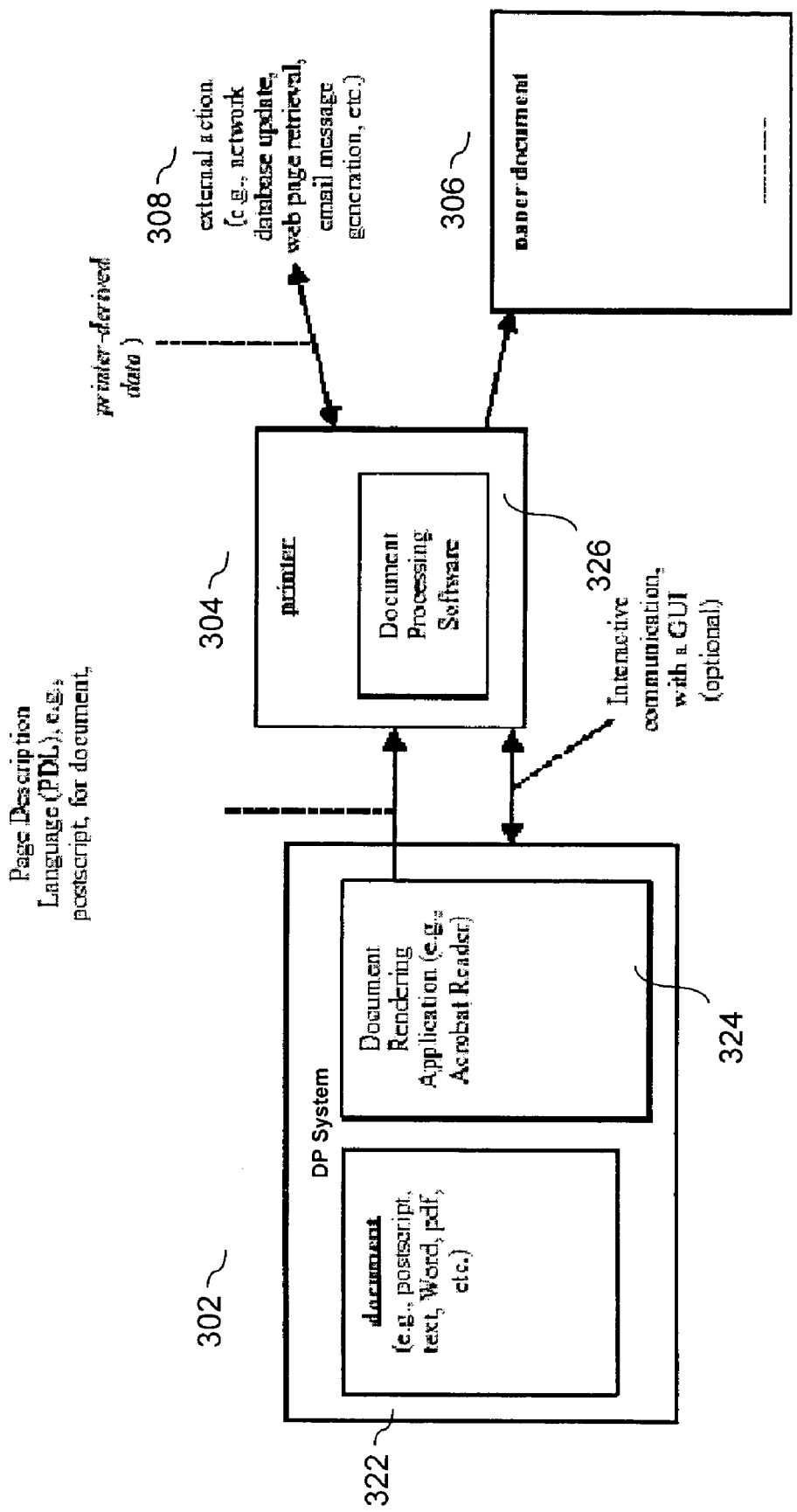
FIG. 3(c) shows a third embodiment of the present invention for printing a paper document and additionally performing an action.

No Author-Provided Data No Application Plug-In Complex Document Processing by Printer FIG. 3(c) shows a third embodiment of the present invention for printing a paper document and additionally performing an action. FIG. 5(c) shows a flow chart of a method used by this system. In such an implementation, analysis of the document is performed on the printer 304, eliminating the need for modifications or plug-ins on the data processing system 302. In one embodiment, the printer analyzes halftone images sent to the printer. This analysis allows the printer to monitor its use of toner. A filter applied to a PDL file by document processing software 326 detects halftone rendering. A running tabulation of half tone printing is maintained on the printer and is periodically reported to an email address (either a predetermined email address or an email address specified in the document). In general, the author name often may be obtained from the document itself. The IP address of the author's computer is normally communicated to the printer with the document to be printed.

Another embodiment monitors the user of commercial fonts in printed documents and calculates license fees required by user of the fonts. Data about the license fees are optionally stored in a database or printed or emailed to an appropriate location.

Another embodiment monitors the document for predefined pornographic words (or images, identified by name) and notifies an authority figure if such is found. This embodiment is extremely helpful in monitoring misuse of company resources.

Another embodiment monitors the document for confidential terms such as project names or passwords and notifies an authority figure if such are found in a document to be printed. This embodiment is extremely useful in helping to implement internal security procedures.

The above embodiments provide examples of applying a calculation or analysis to the document received by the printer 304 and performing an action (besides printing) based on the calculation or analysis.

Figure 3D:
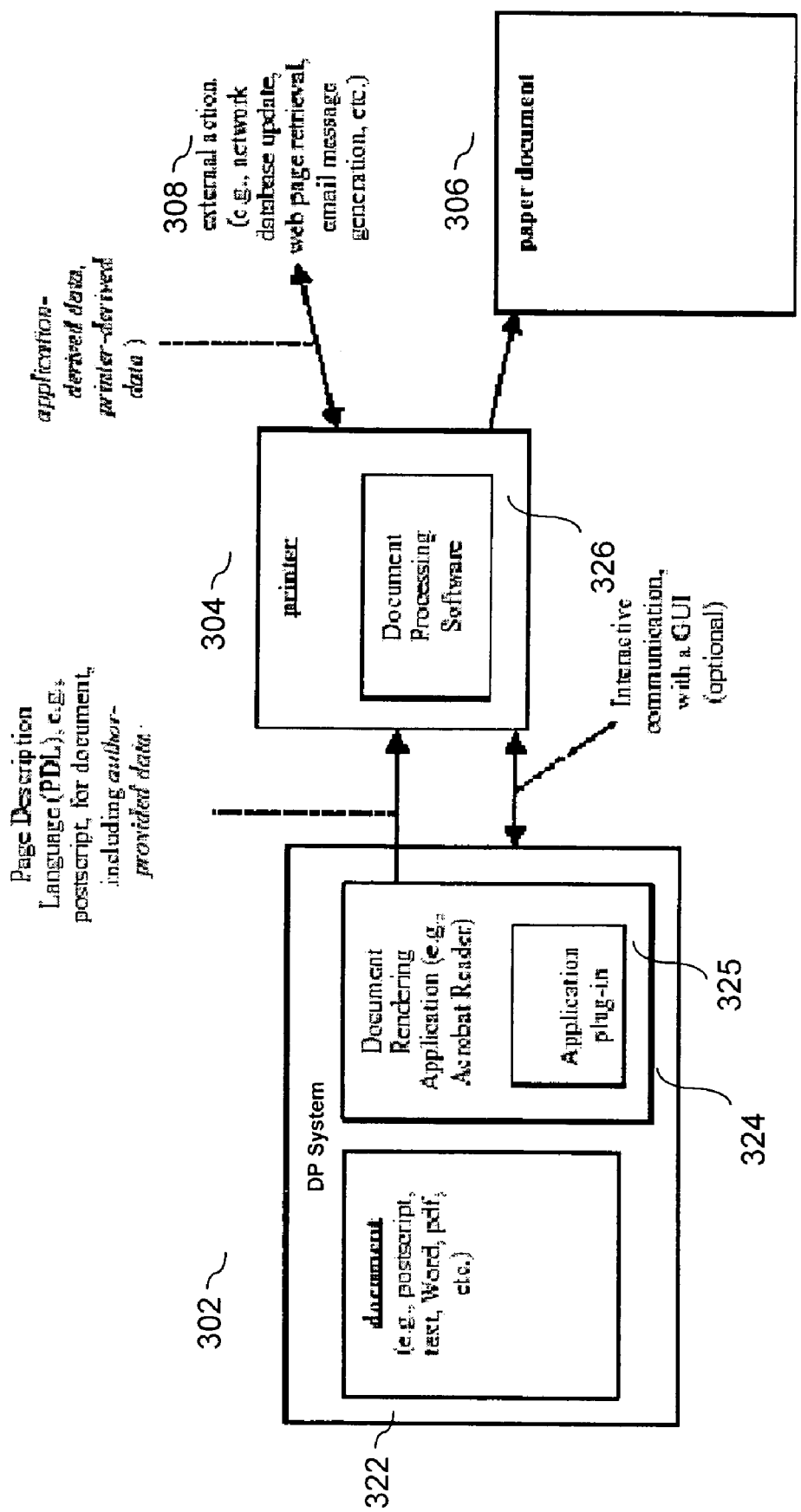
FIG. 3(d) shows a fourth embodiment of the present invention for printing a paper document and additionally performing an action.

No Author-Provided Data Application Plug-In, Simple Document Processing by Printer FIG. 3(d) shows a fourth embodiment of the present invention for printing a paper document and additionally performing an action. FIG. 5(d) shows a flow chart of a method used by this system. This implementation includes no author-provided data, but does include a plug-in of similar modification to the document rendering application or browser 324. In one embodiment, document rendering application 324 detects web URLs in a document to be printed and embeds those URLs in the document or its PDL file. Document processing software 326 receives these URLs as part of a command to communicate with a local proxy server. The proxy server is instructed to pre-cache the pages corresponding to the detected URLs, under the assumption that those pages will be accessed shortly after the user reads the printed document. Alternatively, the document processing software 304 retrieves the indicated pages and archives them in a local database. Alternatively, the analysis to detect the URLs is performed by the printer 304 instead of by data processing system 302. As described above, the pages could be cached, stored in a database, or printed in addition to the document.

In certain embodiments, the plug-in detects and sends all form fields in a document. In certain other embodiments, the plug-in searches for certain fields, either in response to user input or because the names of the forms are pre-programmed.

Additional Embodiments

It will be understood by persons of ordinary skill in the art that the processing described above can be performed at various locations within the system. For example, the processing described above in connection with "complex document processing" performed by the printer 304 could also be performed, either totally or partially by data processing system 302. Similarly, processing described as being performed by software on data processing system 302 could be performed by document processing software in printer 304. Similarly, processing could be performed both by the data processing system/document source and by the printer (see, for example, flowchart of FIG. 5(e)).

One advantage of using plug-ins in data processing system 302 is that they are easy to add to existing software. In contrast, one advantage of performing most or all processing on the printer side is that printers are easier to maintain and service than user computers. In addition, if a large enterprise is going to purchase special processing software, it is less expensive to purchase software that runs on a small number of printers as opposed to software that runs on each user machine. This is even more important if special purpose hardware (such as a powerful signal processor) is needed to perform the function, because of the expense and difficulty of such installations. Moreover, the work environment of printers is usually better monitored and it is physically easier to maintain security over printers that contain sensitive analysis programs (such as programs that monitor compliance with licensing or seat requirements or with security requirements) than if this analysis software was located in users' computers.

The following paragraphs contain additional examples of "complex processing" by a printer. The printer recognizes a PDL file directly and analyzes the file to detect certain known fields. For example, if the printer will be used to print many Department of Motor Vehicle (DMV) forms (i.e., forms having a known format and content), the printer can analyze the printed documents to detect predetermined values such as name, address, etc and construct a database update command. In certain embodiments, the printer asks for user confirmation before updating the database (see following section on interactive printer commands).

In another example, the printer renders the PDL file as an image using, for example the PDL interpreter on the printer, and applies a forms recognition system such as the Ascent Capture package available from Kofax Image Products of Irvine, Calif. Again, in certain embodiments, the printer asks for user confirmation before performing the action.

Interactive Communication with a Printer

Figure 4:
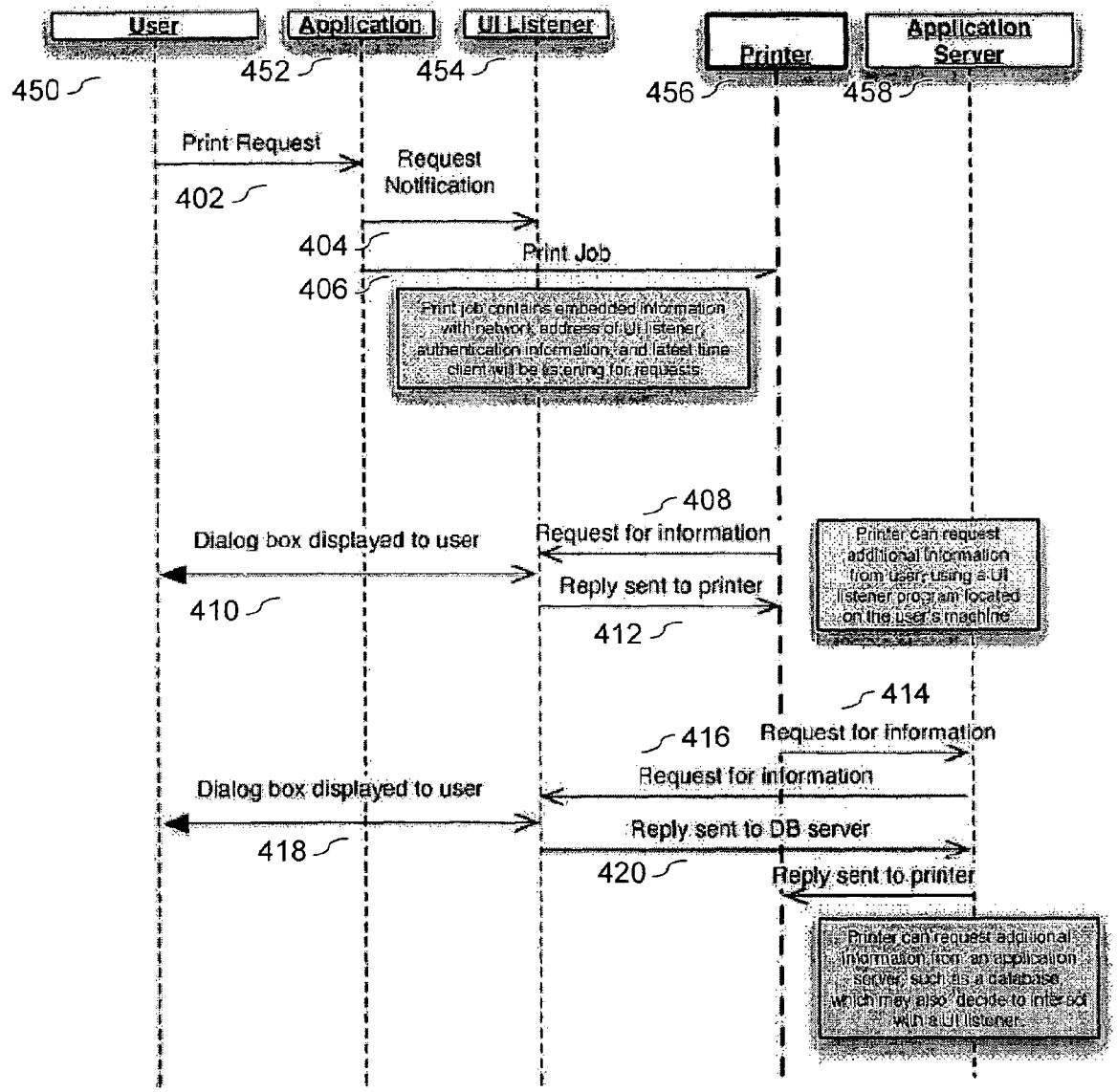
FIG. 4 shows an example of interactive communication with a printer in accordance with the present invention.

FIG. 4 shows an example of interactive communication with a printer in accordance with the present invention.

In general, conventional printer drivers in modern operating systems are not designed to facilitate interactive information gathering. Because the print job can be redirected to another printer, or the printing protocol does not allow such interactive sessions, the operating system does not encourage interaction with the user. Once initial printer settings are captured, further interactions are generally not allowed in conventional printers. One approach to this problem is to embed metadata into the print stream itself, as noted above. However, it is possible that the printer could need to ask the user for more information, in response to computations made from the data supplied by the user. In addition, the printer itself might delegate some tasks to other application servers, which might in turn need more information from the user. So-called "Web services" or "grid computing" systems are examples of the sort of application server that the printer might trigger.

In order to allow this interaction, without modifying printer driver architecture of the underlying operating system, an extra mechanism, such as the one shown in FIG. 4, is constructed. A "UI Listener," program 454 listens to a network socket, accepts requests for information 408, interacts with a user to obtain such data, and then sends the data back to the requester.

Once a print request 402 is sent by user 450 and notification requested from the UI listener 404, the print job is sent by application 452. Here, the print job contains embedded information including the network address of the UI listener, authentication information, and the latest time that the client will be listening for requests.

If the printer requires additional information of confirmation, it sends a request 408, which is detected by the UI listener, which displays a dialog box to obtain input from the user 410. An example of such a request might be a request for a password or user confirmation code that the user must enter to access a database 458. Alternatively, the printer asks for additional information based on computation, such as noting the absence of a required field and asking for a value to be entered before printing. The user's input is included in a reply 412 sent to the printer. If the reply does not satisfy the printer it may ask for additional information (not shown). If the reply does satisfy the printer, it takes a next step. This step might be to perform an action such as sending an email (not shown). The next step might also be sending a request for information 414 to an application server (such as a database) 458. In this example, application server 458 also sends a request for information 416, which is detected by the UI listener. The user is prompted 418 and his response forwarded to the application server 420. In this example, a reply is then sent from the application server 458 to the printer 456. It will be understood that a particular embodiment may include either or none or requests 408 and 416 without departing from the spirit of the present invention.

A program such as that shown in FIG. 4 may have a fixed set of possible interactions, or may accept a flexible command syntax that allows the requester to display many different requests. An example of such a command syntax would be the standard web browser's ability to display HTML forms. These forms are generated by a remote server, and displayed by the browser, which then returns results to the server. In this embodiment, however, the UI listener is different from a browser in that a user does not generate the initial request to see a form. Instead, the remote machine generates this request. In the described embodiment, the UI listener is a server, not a client.

Because network transactions of this type are prone to many complex error conditions, a system of timeouts would be necessary to assure robust operation. Normally, each message sent across a network either expects a reply or is a one-way message. Messages which expect replies generally have a timeout, a limited period of time during which it is acceptable for the reply to arrive. In this embodiment, embedded metadata would include metadata about a UI listener that will accept requests for further information. Such metadata preferably includes at least a network address, port number, and a timeout period. It might also include authentication information, designed to prevent malicious attempts to elicit information from the user. Because the user cannot tell whether the request is coming from a printer, a delegated server, or a malicious agent, prudence suggests strong authentication by the UI listener. If the printer or a delegated application server wishes more information, it can use the above noted information to request that the UI listener ask a user for the needed information.

While the present invention has been described with reference to certain preferred embodiments, those skilled in the art will recognize that various modifications may be provided. For example, certain embodiments employ multiple application servers, acting in cooperation to perform a function or request. Any of the above functions or requests can be sent across a network, or using local cables such as IEEE1394, Universal Serial Bus, or wireless networks such as IEEE 802.11 or IEEE 802.15 networks, in any combination. Variations upon and modifications to the preferred embodiments are provided for by the present invention, which is limited only by the following claims.

What is claimed is:

1. A method, comprising:
   receiving, by a data processing system, an electronic document having printed and non-printed data contained in the electronic document;
   analyzing, by the data processing system, the printed data;
   analyzing, by the data processing system, the non-printed data;
   triggering, by the data processing system, an action based the analysis of the printed and non-printed data; and
   performing, by a printer, the action, wherein the action is selected from the group consisting of updating a database, sending an email, monitoring a use of fonts in the document, and monitoring a use of halftones in the document.

2. The method of claim 1, further comprising printing the received electronic document.

3. The method of claim 1, further comprising printing a confirmation of completion of the performed action.

4. The method of claim 1, further comprising sending a message confirming completion of the performed action.

5. The method of claim 4, wherein the message is an email sent to a source of the document.

6. The method of claim 1, further comprising printing the received electronic document and wherein the action comprises printing a certificate confirming that printed and non-printed data of the printed document is equal to data provided to the action taken.

7. The method of claim 1, wherein the printed and non-printed data of the received electronic document includes user-provided data.

8. The method of claim 1, wherein the printed and non-printed data of the received electronic document includes data that is the result of analysis by a document rendering application on a computer that is a source of the document.

9. The method of claim 1,
   wherein the analyzing of the printed data is performed by the printer,
   wherein the analyzing of the non-printed data is performed by the printer; and
   wherein performing the action further comprises performing an action in accordance with a result of the analysis by the printer.

10. The method of claim 1, wherein the printer is a local printer.

11. The method of claim 1, wherein the printer is a remote printer.

12. The method of claim 1, wherein updating the database comprises updating the database in accordance with the printed and non-printed data of the electronic document.

13. The method of claim 1, wherein sending the email comprises sending the email confirming printing of the document.

14. The method of claim 1, wherein monitoring the use of fonts in the document comprises monitoring the use of fonts in the document to assure compliance with a license for the fonts.

15. The method of claim 1, further comprising sending an interactive request to a source of the document and waiting to receive a response before performing the action.

16. The method of claim 1, wherein the printer analyzes the printed and non-printed data of the document for pornography and wherein the action comprises sending a notice if pornography is found.

17. The method of claim 1, wherein the printer analyzes the printed and non-printed data of the document for confidential terms and wherein the action comprises sending a notice if confidential terms are found.

18. The method of claim 1, wherein the printer performs optical character recognition of a received postscript document, and wherein the action comprises an action in accordance with a result of the optical character recognition.

19. A printer comprising:
   means for receiving, by a data processing system, an electronic document having printed and non-printed data contained in the electronic document;
   means for analyzing, by the data processing system, the printed data;
   means for analyzing, by the data processing system, the non-printed data;
   means for triggering, by the data processing system, an action based on the analysis of the printed and non-printed data; and
   means for performing, by a printer, the action wherein the action is selected from the group consisting of updating a database, sending an email, monitoring a use of fonts in the document, and monitoring a use of halftones in the document.

20. A computer program product having a medium storing computer instructions capable of performing a method, the method comprising:
   receiving an electronic document having printed and non-printed data contained in the electronic document;
   analyzing, by the data processing system, the printed data;
   analyzing, by the data processing system, the non-printed data; and
   creating a non-printing command to the document, the command instructing a printer to perform an action besides printing relating to the printed and non-printed data contained in the electronic document, wherein the action is selected from the group consisting of updating a database, sending an email, monitoring a use of fonts in the document, and monitoring a use of halftones in the document.

* * * * *